May 17, 1960 E. V. HARPER 2,936,806
WELD NUT
Filed July 15, 1957
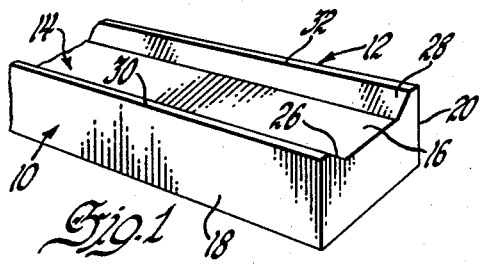
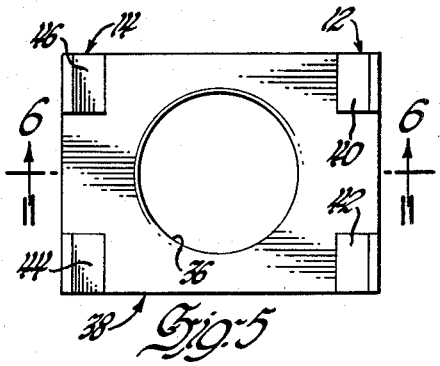
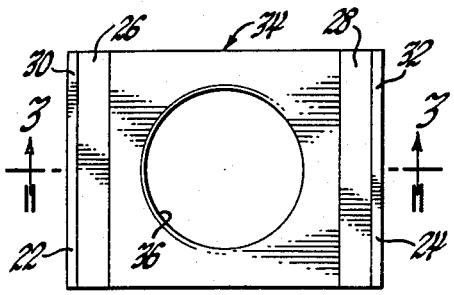
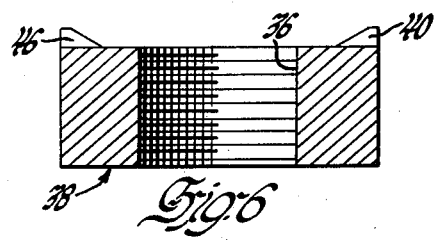
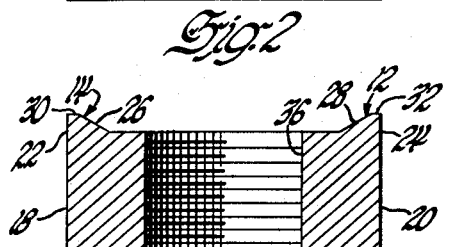
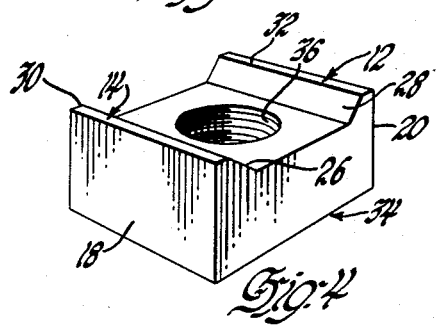
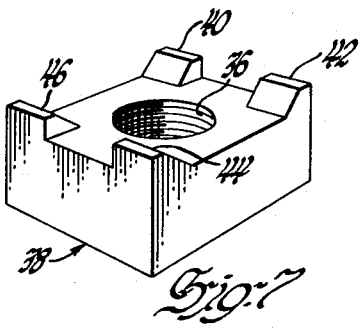
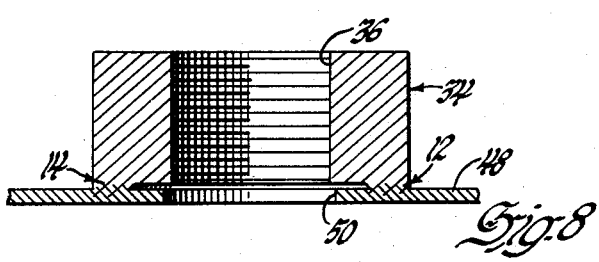
INVENTOR.
Ernest V. Harper
BY
ATTORNEY

United States Patent Office 2,936,806
Patented May 17, 1960

2,936,806
WELD NUT

Ernest V. Harper, Utica, Mich., assignor to General Motors Corporation, Detroit, Mich., a corporation of Delaware Application July 15, 1957, Serial No. 672,026

1 Claim. (Cl. 151—41.7)

This invention relates to weld nuts in general and more specifically to a particular form of weld nut and its method of manufacture.

In sheet metal work, such as in automotive production, it is often found advantageous to secure a heavier piece of metal behind the thin sheet metal where threaded fasteners are required to be used. Such pieces of metal are commonly referred to as "weld nuts" and generally comprise a threaded nut member having projections formed on one face thereof which are readily fused or welded to the supporting sheet metal to hold the threaded nut in position.

The difficulties encountered in manufacturing a good weld nut include forming all of the weld projections of the same height so that each contributes in holding the nut in place and so that the nut itself is disposed parallel to the member to which it is secured in order to be disposed to best receive a bolt or screw member.

Another objection to many weld nuts is their affinity to collect weld splatter in the threaded aperture of the nut in the course of securing the nut member to a supporting member.

Although numerous different types of weld nuts have been proposed, the balance of production costs against some of the objectional features of weld nuts has made it commercially impractical to manufacture a really acceptable weld nut fastener.

It is the purpose of this disclosure to teach the manufacture of a weld nut which includes none of the objections raised against other weld nuts and which is less expensive to manufacture than other presently known weld nuts.

The proposed weld nut is formed from a length of bar stock which is cold rolled or otherwise processed to provide rib portions on one face thereof which are, in effect, extensions of the side walls of the bar stock since the outer walls of the ribs are contiguous with the side walls of the bar stock. In the forming of the bar stock material, the inner side walls of the rib portions are chamfered toward the face of the stock, leaving longitudinally disposed ledge portions along each side of the bar stock of less width than the rib portions.

The bar stock just described may be readily and inexpensively formed in a rolling mill and furnished to a manufacturer in any given length. All that remains to produce weld nuts is the inexpensive and simple operations of cutting off sections of the bar stock and forming a threaded aperture through the cut-off sections and between the rib portions which, as part of the nut member, serve as the weld projections.

In instances where weld splatter becomes a problem because of the small size of the weld nut or for some other reason, the center section of the rib portions on each nut may be removed to leave weld projections at each corner of the weld nut and which are farther removed from the threaded aperture.

In the drawings:

Figure 1 is a length of bar stock formed to the required cross section for the manufacture of the proposed weld nuts.

Figure 2 is a top plan view of one of the proposed weld nuts.

Figure 3 is a cross-sectional view of the weld nut shown in Figure 2 taken in the plane of line 3—3 thereof.

Figure 4 is a perspective view of the weld nut of Figures 2 and 3.

Figure 5 is a top plan view of a modification of the proposed type of weld nut.

Figure 6 is a cross-sectional view of the weld nut of Figure 5 taken in the plane of line 6—6 thereof.

Figure 7 is a perspective view of the weld nut disclosed in Figures 5 and 6.

Figure 8 is a cross-sectioned view of one of the proposed weld nuts secured to a supporting member.

A length of bar stock 10 is received from a rolling mill where it has been cold rolled or otherwise formed to include parallel spaced rib portions 12 and 14 on one face 16 and along the side walls 18 and 20 thereof. The rib portions, in effect, are extensions of the side walls 18 and 20 of the bar stock since the outer side walls 22 and 24 of the rib portions are contiguous with the side walls of the bar stock.

The rib portions 12 and 14 have the inner side walls 26 and 28 thereof chamfered toward the face 16 of the stock as by having the inner upper corner edges of the ribs cut away. This leaves ledge portions 30 and 32 extending longitudinally of the length of bar stock and which are coplanar and parallel to the face 16 of the bar stock.

A section of the bar stock 10 is cut therefrom to form a weld nut 34, such as is shown in Figures 2–4, and the threaded aperture 36 is formed through the faces of the nut centrally between the rib portions 12 and 14.

The section of bar stock 10 used to form a weld nut is preferably rectangular in surface configuration in order that the face 16 of the nut member between the rib portions will be generally square and the threaded aperture 36 will be equally spaced apart from the ribs as it is from the ends of the nut. This is best shown in Figure 2 of the drawing.

The rib portions 12 and 14 serve as the weld projections for each weld nut with the flat ledge portions 30 and 32 which extend the full length of the nut providing adequate contact with any member to which the weld nut is to be secured. The ledge portions being disposed as they are as far removed from the threaded aperture 36 as possible, and the chamfered side walls 26 and 28 being provided, adequately safeguards the threaded aperture against receiving any weld splatter in the securing of the weld nut to a supporting member.

The general shape of the weld projections is preferably as shown although the slope of the chamfered side walls 26 and 28 may be changed as required to provide uniform and constant welding. The increasing thickness of the weld projection from the end to the base thereof insures an increasing resistance to weld collapse which means the projections are collapsed during the welding process at a slowing rate conducive to a good weld in that they are not as subject to over-heating and blow-away.

In instances where a greater distance is required between the weld projections and the threaded aperture of the weld nut, as with a weld nut of small size, or where the nut is to be secured to a curved surface and the line contact afforded by the ledge portions 30 and 32 is not advantageous, the center section of the rib portions 12 and 14 of each nut member may be removed, as by a milling, broaching or other operation, to provide separate weld projections 40, 42, 44 and 46, at each corner of the nut member as shown on the weld nut 38 of Figures 5-7.

The weld nut 34 is shown in Figure 8 secured to a supporting panel member 48 having an aperture 50 provided therethrough, with the weld projections 12 and 14 fused with the panel member and the threaded aperture 36 aligned over the panel aperture 50. The spacing of the weld projections from the bolt or screw receiving apertures 36 and 50 is most apparent in Figure 8 and points out quite clearly the unlikelihood of weld splatter reaching the apertures.

What is claimed is:

A weld nut comprising a substantially rectangular surfaced section of bar stock having a threaded aperture provided therethrough, the interior side walls of said section of bar stock being formed to include parallel spaced projections extending the length and disposed on one face thereof and leaving a substantially square and symmetrical face portion about said aperture, said projections having the outer side walls thereof contiguous with the side walls of said section of bar stock, top walls disposed in the same plane and parallel to the face of said section of bar stock, and inner side walls of said projections inclined from the base thereof outwardly and away from said threaded aperture.

References Cited in the file of this patent

UNITED STATES PATENTS

| | | |
|---|---|---|
| 396,477 | Goodwin | Jan. 22, 1889 |
| 2,073,467 | Demboski | Mar. 9, 1937 |
| 2,310,316 | Renner | Feb. 9, 1943 |